US012747133B2

(12) United States Patent
Ruhnke et al.

(10) Patent No.: US 12,747,133 B2
(45) Date of Patent: Sep. 29, 2026

(54) DETECTING A PROBE REQUEST IN METHOD AND SYSTEM FOR CONTROLLING AN ELEVATOR CAR

(71) Applicant: Otis Elevator Company, Farmington, CT (US)

(72) Inventors: Jan Ruhnke, Berlin (DE); Felix Donath, Berlin (DE)

(73) Assignee: OTIS GMBH & CO. OHG, Berlin (DE)

( * ) Notice: Subject to any disclaimer, the term of this patent is extended or adjusted under 35 U.S.C. 154(b) by 596 days.

(21) Appl. No.: 18/448,267

(22) Filed: Aug. 11, 2023

(65) Prior Publication Data

US 2024/0158202 A1 May 16, 2024

(30) Foreign Application Priority Data

Nov. 10, 2022 (EP) .................................... 22206613

(51) Int. Cl.
*B66B 1/46* (2006.01)
*B66B 1/34* (2006.01)

(52) U.S. Cl.
CPC ............ *B66B 1/468* (2013.01); *B66B 1/3423* (2013.01); *B66B 1/3461* (2013.01); *B66B 2201/4638* (2013.01); *B66B 2201/4653* (2013.01)

(58) Field of Classification Search
CPC ........... B66B 1/06; B66B 1/34; B66B 1/3423; B66B 1/3461; B66B 2201/211; B66B 2201/4638; B66B 1/468
USPC ........................................................ 187/380
See application file for complete search history.

(56) References Cited

U.S. PATENT DOCUMENTS

2007/0151809 A1* 7/2007 Tyni .......................... B66B 3/00 187/391
2017/0362052 A1* 12/2017 Chapman .............. B66B 1/3461
2019/0161318 A1* 5/2019 Wedzikowski ....... B66B 1/2408
2020/0207577 A1* 7/2020 Kottur ..................... B66B 3/002
(Continued)

FOREIGN PATENT DOCUMENTS

CN 106044421 A 10/2016
EP 3885301 A1 9/2021

OTHER PUBLICATIONS

Ren et al. (CN 106044421 A) An Intelligent Interactive Elevator System (Year: 2016).*

(Continued)

*Primary Examiner* — Jorge L Carrasquillo
(74) *Attorney, Agent, or Firm* — CANTOR COLBURN LLP

(57) ABSTRACT

An elevator system with an elevator car includes a controller for the elevator car, at least one processor, and a wireless network access point. According to a method of controlling the elevator car, a portable device transmits a probe request, the portable device is carried by a passenger of the elevator system. The probe request contains at least a first probe request data set, the first probe request data set is of a first type. The wireless network access point detects the probe request. The at least one processor accesses data storage. In the data storage there is stored a plurality of passenger profiles. Each passenger profile of the plurality of passenger profiles contains a first profile data set of the first type and a second profile data set representing at least one destination floor.

15 Claims, 6 Drawing Sheets

(56) References Cited

U.S. PATENT DOCUMENTS

| | | | | |
|---|---|---|---|---|
| 2020/0277159 | A1* | 9/2020 | Larmuseau | H04W 4/80 |
| 2023/0078706 | A1* | 3/2023 | Makabe | B66B 5/0012 187/380 |

OTHER PUBLICATIONS

Yang (CN 109543886 B) Destination Prediction Method, Device, Terminal and Storage Medi (Year: 2021).*
Traitola (EP 3885301 A1) Method and Apparatus for Predicting Floor Information for a Destination Call (Year: 2021).*
Liu et al. (CN 108665178 B) Based on a Subway Escalator Passenger Flow Prediction Method of AFC in the Floor (Year: 2020).*
European Search Report for Application No. 22206613.6; Issued Apr. 25, 2023, 6 Pages.
Chinese Office Action for Application No. 202311496921.7, Issued Mar. 24, 2026, 8 Pages.

* cited by examiner

DETECTING A PROBE REQUEST IN METHOD AND SYSTEM FOR CONTROLLING AN ELEVATOR CAR

FOREIGN PRIORITY

This application claims priority to European Patent Application No. 22206613.6, filed Nov. 10, 2022, and all the benefits accruing therefrom under 35 U.S.C. § 119, the contents of which in its entirety are herein incorporated by reference.

TECHNICAL FIELD

The present disclosure generally relates to the field of elevator systems, and more specifically, the present disclosure relates to methods and systems for determining an anticipated destination floor for a passenger of an elevator system and controlling an elevator car to move it to the anticipated destination floor.

BACKGROUND

It is known in the field of elevator systems to provide an elevator-calling device or a floor-selection panel on each floor that is served by an elevator system to allow a passenger of the elevator system to summon an elevator car for use. It is also known to provide a floor-selection panel inside an elevator car to allow a passenger to select their destination floor after they have entered the elevator car, wherein after a destination floor has been input by the passenger, a controller of the elevator car controls the elevator car to move it to the destination floor.

A common elevator-calling device is a hall call fixture having a go-up button and a go-down button. It is also known in the art to allow passengers carrying a portable device with network access (e.g. a mobile phone) to remotely summon an elevator car using an app on the portable device. A common floor-selection panel provided in elevator cars is a panel of numbered buttons where each numbered button corresponds to a floor.

There is a desire to provide an improved system and method for controlling an elevator car to transport a passenger of the elevator system to a desired floor.

SUMMARY

According to a first aspect of this disclosure, there is provided a method of controlling an elevator car in an elevator system, wherein the elevator system comprises a controller for the elevator car, at least one processor, and a wireless network access point; the method comprising: a portable device transmitting a probe request, wherein the portable device is carried by a passenger of the elevator system, and wherein the probe request contains at least a first probe request data set, wherein the first probe request data set is of a first type; the wireless network access point detecting the probe request; the at least one processor accessing data storage, the data storage having stored therein a plurality of passenger profiles wherein each passenger profile of the plurality of passenger profiles contains a first profile data set of the first type and a second profile data set representing at least one destination floor; the at least one processor identifying a matching passenger profile of the plurality of passenger profiles, wherein the first profile data set of the matching passenger profile matches the first probe request data set; the at least one processor determining an anticipated destination floor based on the second profile data set of the matching passenger profile; and the at least one processor instructing the controller to move the elevator car to the anticipated destination floor.

The disclosure extends to an elevator system, comprising: an elevator car; a controller for controlling the elevator car; a wireless network access point configured to detect a probe request transmitted by a portable device carried by a passenger of the elevator system, wherein the probe request contains at least a first probe request data set, wherein the first probe request data set is of a first type; at least one processor; and a computer-readable medium having stored therein instructions which, when executed by the at least one processor, cause the at least one processor to carry out the following method steps: accessing data storage, the data storage having stored therein a plurality of passenger profiles wherein each passenger profile of the plurality of passenger profiles contains a first profile data set of the first type and a second profile data set representing at least one destination floor; and identifying a matching passenger profile of the plurality of passenger profiles, wherein the first profile data set of the matching passenger profile matches the first probe request data set; determining an anticipated destination floor based on the second profile data set of the matching passenger profile; and instructing the controller to move the elevator car to the anticipated destination floor.

It will be appreciated from the present disclosure that matching data from a probe request transmitted by a portable device to corresponding data in one of a plurality of passenger profiles contained in data storage can allow the portable device (and therefore the passenger carrying the portable device) to be associated with a specific, matching passenger profile contained in the data storage. The inclusion of data representing at least one destination floor in the matching passenger profile means that an anticipated destination floor can be determined for the passenger. Furthermore, it will be appreciated that, owing to the probe request being transmitted by the portable device, the wireless network access point can detect the presence of the portable device and identify the matching passenger profile in order to determine the anticipated destination floor without requiring any input by the passenger carrying the portable device (e.g. pressing of buttons on a call panel, input on a mobile phone app to summon an elevator car, etc.).

It can thus be seen that the method and system of the present disclosure may allow an elevator car to transport a passenger to their desired destination floor without requiring any input to the elevator system from the passenger. This may make the use of the elevator system by the passenger faster and/or more convenient, e.g. by determining an anticipated floor more quickly than the passenger might press the corresponding button (especially if there are multiple passengers wishing to travel to different floors), reducing or eliminating delays from incorrectly pressed buttons, etc. It may also eliminate or reduce the need for the passenger to physically touch hardware of the elevator system (e.g. a floor-selection panel), which may provide hygiene benefits (e.g. by reducing transmission of infectious diseases spread by physical contact). It may also allow for the elevator system to be used by passengers other than people, e.g. passengers that may not be able to provide input to select a destination floor, e.g. animals, automated objects, etc. In addition, the present disclosed method and system may avoid any need for prior configuration of the portable device for use with the elevator system (e.g. by downloading an app or setting up an account), because the method and system use a probe request that may already be automatically transmitted by the portable device as part of its normal operation (e.g. when the portable device is seeking nearby wireless networks to connect to).

In the context of the present disclosure, a "passenger" may refer to anything (e.g. any person, animal or object, e.g. a pet, an automated object, a robot, a service animal, a service robot, etc.) that travels in the elevator car to a destination floor. It will be appreciated that some actions described in the context of some examples (e.g. pushing a button or otherwise providing input to the elevator system) may typically not be performable by some non-human passengers (e.g. animals, objects), but they may be performable some other non-human passengers (e.g. service robots). In general, it is to be understood that a "passenger" does not necessarily need to be able to perform all of the actions mentioned in the context of the examples given in the present disclosure.

In the context of the present disclosure, when a destination floor is referred to as an "anticipated" destination floor, this means that the destination floor has been determined to be the destination floor to which the passenger is likely to be intending to travel (or, in the case that the passenger is not a person, the floor to which the passenger is intended to travel, e.g. intended by owner of the animal or object). The anticipated destination floor may also be described as a predicted destination floor for the passenger.

The anticipated destination floor may be determined in various ways based on the second passenger profile data set in the matching passenger profile. For example, the anticipated destination floor may be determined to be the most frequently visited destination floor. In addition, or alternatively, the anticipated destination floor may be determined based on other factors, e.g. time and/or date (e.g. time of day, day of the week), the floor on which the passenger boarded the elevator car, other passengers determined to be travelling with the passenger in the elevator car, and/or external factors that might influence passenger behaviour (such as the weather).

The elevator system may comprise the data storage. The computer-readable medium having the instructions stored therein may be part of the data storage or it may be separate from the data storage. For example, the data storage may comprise a single computer-readable medium, wherein the single computer-readable medium stores both the instructions and the plurality of passenger profiles. As another example applicable to an elevator system comprising multiple elevator cars (as discussed in more detail below), each elevator car may comprise a respective individual computer-readable medium, wherein each individual computer-readable medium stores both the instructions for the respective elevator car and a copy of the plurality of the passenger profiles, and wherein the data storage comprises all of the individual computer-readable media. The data storage or part of the data storage may be remote from the elevator system, e.g. on a remote server and/or in the cloud.

The method may comprise the at least one processor receiving data representing the probe request from the wireless network access point, e.g. data comprising the first probe request data set.

The method may comprise the elevator car moving to the anticipated destination floor, e.g. in response to the at least one processor instructing the controller to move the elevator car to the anticipated destination floor. The passenger may be inside the elevator car while the elevator car moves to the anticipated destination floor.

The elevator system may be arranged so that the elevator car can travel between a plurality of floors. Each floor may comprise an elevator hall (which may also be referred to as an elevator landing). The terms "elevator hall" and "elevator landing" may be used to refer to a physical space in a vicinity of an elevator access door on a floor, via which passengers of the elevator car can board the elevator car on that floor. The elevator hall may be used as a waiting area where a passenger of the elevator system can wait for an elevator car, e.g. an area from which the elevator access door is visible to the passenger.

The elevator system may comprise one or more elevator-calling devices, e.g. elevator-calling panels. The one or more elevator-calling devices may each comprise at least one button for calling the elevator car, e.g. a go-up button and/or a go-down button, or a set of floor-selection buttons. An elevator-calling device may be provided on each floor that is served by the elevator system, e.g. in an elevator hall on each floor, e.g. adjacent to an elevator access door through which passengers access the elevator car when the elevator car is present at the respective floor.

The elevator car may comprise a floor-selection panel. The floor-selection panel may comprise an input mechanism (e.g. a plurality of buttons and/or touchscreen) for a passenger to select a destination floor.

It is known to the person skilled in the art that, in the context of wireless networking, a probe request may be described as a data transmission or "control frame" that is actively transmitted by a device for the purpose of network discovery, i.e. to find a network for the device to connect to. Data contained in the probe request enables wireless network access points of suitable networks to respond to the probe request to facilitate the initiation of a network connection. The data contained in a probe request from any given device will typically be different from the data contained in probe requests from other devices. For example, the probe request may contain data identifying wireless networks, e.g. a list of wireless networks, that are already known to the device (i.e. to which the device has previously connected). Such data may be used to distinguish between devices, e.g. to uniquely identify them.

The probe request may be any type of probe request that is automatically transmitted by the portable device. The probe request may be any type of probe request that is suitable for facilitating the initiation of a connection with a wireless network via the wireless network access point, e.g. with a WLAN (wireless local-area network) or Wi-Fi network.

The term 'data type' may be understood to refer to the nature of the content of a data set. The first data type may be data that identifies one or more wireless networks, e.g. the first probe request data set and the first profile data set may each be or comprise data identifying one or more wireless networks, e.g. one or more Service Set Identifiers (SSIDs). Thus, in the present disclosure, any data set of the first type may be a data set comprising one or more Service Set Identifiers (SSIDs).

The first probe request data set may be any suitable data contained in the probe request that can be used to distinguish between at least some portable devices that transmit probe requests. The first probe data set may be any suitable data contained in the probe request that can be used to uniquely identify a portable device, however this is not essential. For example, it may be possible for more than one portable device to transmit respective probe requests with identical first probe request data sets, but wherein for at least some portable devices, the respective first probe request data sets transmitted by said portable devices are distinct. For example, the first probe request data set may comprise a list of one or more Service Set Identifiers (SSIDs), e.g. corresponding to a list of wireless networks to which the portable device has previously connected. It may be expected that for any given portable device, the list of one or more SSIDs will be distinct from each list of SSIDs transmitted by the majority of other portable devices, as the majority of other portable devices will not have previously connected to exactly the same set of networks. It is to be understood that the benefits of the present disclosure may therefore be obtained notwithstanding that it may be theoretically possible for two portable devices to transmit probe requests having identical first probe request data sets.

It is known to the person skilled in the art that, in the context of wireless networking, a wireless network access point may be described as a device that allows wireless-networking-enabled devices to connect to a wired network via the wireless network access point. The wireless network access point may be capable of supporting a wireless network, e.g. between the wireless network access point and at least the portable device. The wireless network access point may be connected to a router. The wireless network access point may be part of a router.

The wireless network may be any suitable type of wireless network. For example, the wireless network may be a WLAN (wireless local-area network), e.g. a Wi-Fi network. The wireless network access point may be a WLAN (wireless local-area network) access point e.g. a Wi-Fi access point. The wireless network access point may be configured to provide wireless network access (e.g. to a WLAN or Wi-Fi network) for the portable device, e.g. to provide access to the Internet. Alternatively, the wireless network access point may be a dedicated wireless network access point, e.g. with pared-down functionality, for carrying out only the method of the present disclosure.

The portable device may be any type of wireless-networking-enabled portable device, e.g. a wireless-networking-enabled portable device, e.g. a WLAN-enabled portable device, e.g. a Wi-Fi-enabled portable device. For example, the portable device may be a portable computing device, such as a mobile phone, a tablet, a laptop or a notebook computer. Such portable computing devices are typically carried by persons using an elevator system. In other examples, the portable device may be a portable wireless communications device, e.g. a wireless-networking-enabled tracking tag. Such tracking tags may be carried by animals or objects using an elevator system to move around a building.

Determining that the first passenger profile data set matches the first probe request data set may comprise determining that the first passenger profile data set exactly matches the first probe request data set. For example, the method may identify a matching list of one or more Service Set Identifiers (SSIDs). However, this is not essential. For example, the method may allow for the possibility of changes in the first probe request data set in probe requests transmitted by a portable device over time. For example, in examples in which the first probe request data set is a list of SSIDs (e.g. corresponding to a set of wireless networks that the portable device has previously connected to), it is possible that the portable device is used to connect to a new network between uses of the elevator system, which may add a new SSID to the SSID list. It is also possible that the passenger may delete an unused saved network SSID from the portable device. For example, the method may identify at least one (and preferably more than one) match within a list of several Service Set Identifiers (SSIDs).

Determining that the first passenger profile data set matches the first probe request data set may comprise determining that the first passenger profile data set partially matches the first probe request data set, e.g. to within a defined fidelity. For example, in examples in which the first probe request data set is a list of SSIDs, a passenger profile may be identified as the matching passenger profile if no more than one or no more than two SSIDs are different between the first passenger profile data set and the first probe request data set.

Determining that the first passenger profile data set matches the first probe request data set may comprise determining that the first passenger profile data set of the matching passenger profile is a closest match to the first probe request data set, e.g. compared with all other passenger profiles in the plurality of passenger profiles.

The wireless network access point may be positioned to detect the probe request transmitted by the portable device when the portable device is inside the elevator car. The wireless network access point may be located in or on the elevator car, e.g. the elevator car may comprise the wireless network access point. This may allow the wireless network access point to facilitate the detection of the portable device's presence in the elevator car. For example, if the wireless network access point in or on the elevator car detects the probe request from the portable device, it may be inferred that the passenger carrying the portable device has entered the elevator car. The method may comprise determining (e.g. by the at least one processor) that the person carrying the portable device has entered the elevator car, e.g. based on the wireless network access point located in or on the elevator car detecting the probe request transmitted by the portable device.

As an example operation, a passenger may arrive in an elevator hall on a floor served by the elevator system. The passenger may operate an elevator-calling device (e.g. by pushing a button), which may cause an elevator car to be called to the floor of the elevator hall. Upon arrival of the elevator car at the floor of the elevator hall, the access doors to the elevator car may open, allowing the passenger to enter. The access doors may then close (e.g. after a time delay to allow the passenger time to enter). The wireless network access point in the elevator car may then detect a probe request transmitted by a portable device carried by the passenger, e.g. where the probe request contains an SSID list from the portable device. The processor may then compare the SSID list with SSID lists contained in passenger profiles stored in the data storage and may identify a matching passenger profile whose SSID list matches (wholly or partially) the SSID list in the probe request. The processor may determine from the matching passenger profile a floor that the identified passenger usually travels to, which is determined to be the anticipated destination floor for the passenger. The processor may then instruct the controller to move the elevator car to the anticipated destination floor.

The wireless network access point may be located on a floor served by the elevator system, e.g. in a vicinity of access doors through which a passenger can access the elevator car when it is on said floor. For example, the wireless network access point may be located in an elevator hall on a floor served by the elevator system (e.g. on an entrance-level floor where an entrance to a building containing the elevator system is located). This may allow the wireless network access point to facilitate the detection of the portable device's presence in the elevator hall. For example, if the wireless network access point in the elevator hall detects the probe request from the portable device, it may be inferred that the passenger carrying the portable device is in the elevator hall. It may further be inferred that the passenger in the elevator hall intends to use the elevator system (or in the case that the passenger is not a person, that the passenger is intended, e.g. by its owner, to use the elevator system).

The method may comprise the at least one processor determining that the passenger carrying the portable device intends or is intended to use the elevator system, e.g. based on the wireless network access point located in the elevator hall detecting the probe request transmitted by the portable device, or in response to identifying a matching passenger profile. This means that an elevator car can be allocated to transport the passenger to their/its anticipated destination floor before the passenger has entered the elevator car.

The method may comprise the at least one processor instructing the controller to send an elevator car to the floor containing the elevator hall in which the wireless access point is located. Instructing the controller in this way may occur in response to the at least one processor determining that the passenger carrying the portable device intends or is intended to use the elevator system, or in response to the wireless network access point located in the elevator hall detecting the probe request transmitted by the portable device, or in response to detecting a matching passenger profile.

As an example operation, the wireless network access point in an elevator hall may detect a probe request e.g. containing an SSID list from a portable device. The processor may then compare the SSID list with SSID lists contained in passenger profiles stored in the data storage and may identify a matching passenger profile whose SSID list matches the SSID list in the probe request. The processor may then determine that a known passenger is in the elevator hall and intends (or is intended) to use the elevator system to travel to their/its usual floor. The processor may determine from the matching passenger profile which floor the passenger usually travels to, i.e. the anticipated destination floor. The processor may then instruct the controller to move an elevator car to the floor of the elevator hall. Upon arrival of the elevator car at the floor of elevator hall, the access doors to the elevator car may open, allowing the passenger to enter. The access doors may then close (e.g. after a time delay to allow the passenger time to enter). The processor may then instruct the controller to move the elevator car to the anticipated destination floor. In this example, the passenger does not need to interact with any elevator-calling devices, which may, for example, allow non-human passengers (such as animals, automated objects, etc.) to use the elevator system.

The elevator system may comprise one or more further wireless network access points. For example, the wireless network access point may be located in or on the elevator car and the elevator system may comprise a further wireless network access point in a respective elevator hall on each of one, some or all floors served by the elevator system. The wireless network access point may be located in or on the elevator car and the elevator system may comprise a further wireless network access point in an elevator hall on an entrance-level floor served by the elevator system.

The wireless network access point may be located in or on the elevator car and the elevator system may comprise a further wireless network access point in a respective elevator hall on each floor served by the elevator system.

The wireless network access point may be located in an elevator hall on a floor served by the elevator system and the elevator system may comprise a further wireless network access point in a respective elevator hall on each of one, some or all other floors served by the elevator system.

The portable device may transmit a plurality (e.g. a series) of probe requests, wherein the probe request is one of said plurality (or series) of probe requests, e.g. the portable device may continually transmit probe requests. The method may comprise detecting at least one further probe request transmitted by the portable device.

The method may comprise detecting, by one of the one or more further wireless access points, at least one further probe request transmitted by the portable device. It is to be understood that the at least one further probe request may not necessarily be transmitted after the probe request. The probe request and the at least one further probe request transmitted by the portable device may be transmitted in any order, e.g. the or each further probe request may be transmitted prior to or subsequent to the probe request. Similarly, the probe request and the at least one further probe request may be received in any order (which would typically correspond to the order in which they were transmitted).

The method may comprise determining that the probe request and the at least one further probe request were both or all transmitted by the portable device (i.e. they were not transmitted by different portable devices).

The or each further probe request may contain a respective further probe request data set, wherein the or each further probe request data set is of the first type.

The method may comprise the at least one processor determining that the matching passenger profile corresponds to the at least one further probe request, based on the or each further probe request data type matching the first profile data set.

An example operation will now be described in which the wireless network access point and a further wireless network access point each receive a respective probe request from a portable device.

The wireless network access point may be located in the elevator car and a further wireless network access point may be located in an elevator hall on a floor served by the elevator system. A passenger may arrive in the elevator hall, carrying a portable device that is continually transmitting probe requests (e.g. with an interval of a few seconds, although other intervals are possible), e.g. where each probe request contains an SSID list from the portable device. The further wireless network access point that is located in the elevator hall may detect a first probe request (corresponding to “the further probe request” as defined above) transmitted by the portable device.

A processor (e.g. in the elevator hall or connected to the further wireless network access point) may determine, based on the further wireless network access point detecting the first probe request, that a passenger intends (or is intended) to use the elevator system and may instruct the elevator controller to move the elevator car to the floor of said elevator hall. Upon arrival of the elevator car at the floor of said elevator hall, the access doors may open to allow the passenger to enter the elevator car. During this time, the portable device may continue to transmit probe requests.

When the passenger enters the elevator car, the wireless network access point in the elevator car may detect a second probe request (corresponding to “the probe request” as defined above) transmitted by the portable device. A processor in the elevator car may compare the SSID list contained in the second probe request with SSID lists contained in passenger profiles stored in data storage in the elevator car and may identify a matching passenger profile whose SSID list matches (partially or wholly) the SSID list in the second probe request. The processor may determine from the matching passenger profile which floor the passenger usually travels to, i.e. the anticipated destination floor. The processor may then instruct the controller to move the elevator car to the anticipated destination floor.

A further example operation will now be described in which the wireless network access point and a further wireless network access point each receive a respective probe request from a portable device.

The wireless network access point may be located in the elevator car and a further wireless network access point may be located in an elevator hall on a floor served by the elevator system. A passenger may arrive in the elevator hall, carrying a portable device that is continually transmitting probe requests (e.g. with an interval of a few seconds, although other intervals are possible), where each probe request contains an SSID list from the portable device. The further wireless network access point that is located in the elevator hall may detect a first probe request (corresponding to "the probe request" as defined above) transmitted by the portable device.

A processor in the elevator hall may compare the SSID list contained in the first probe request with SSID lists contained in passenger profiles stored in data storage in the elevator all and may identify a matching passenger profile whose SSID list matches (partially or wholly) the SSID list in the first probe request. The processor in the elevator hall may determine that the portable device is carried by a recognised passenger having an existing profile (i.e. implying that the passenger usually uses the elevator system and may intend or be intended to do so at the time the first probe request is detected, helping to avoid unnecessary elevator calls in response to the presence of, for example, people who do not intend to use the elevator system).

In response to determining that the portable device is carried by a recognised passenger, the processor may instruct the elevator controller to move an elevator car to the floor of the elevator hall. Upon arrival of the elevator car at the floor of said elevator hall, the access doors may open to allow the passenger to enter the elevator car. During this time, the portable device may continue to transmit probe requests.

When the passenger enters the elevator car, the wireless network access point in the elevator car may detect a second probe request (corresponding to "the further probe request" as defined above) transmitted by the portable device. A processor in the elevator car may compare the SSID list contained in the second probe request with SSID lists contained in passenger profiles stored in data storage in the elevator car and may identify the matching passenger profile whose SSID list matches (partially or wholly) the SSID list in the second probe request. The processor may determine from the matching passenger profile which floor the passenger usually travels to, i.e. the anticipated destination floor. The processor may then instruct the controller to move the elevator car to the anticipated destination floor.

The method may comprise detecting, by a further wireless network access point, a further probe request, wherein the further wireless network access point is located in a lobby on a floor served by the elevator system. In this context, a lobby refers to an area through which an elevator hall may be accessed. For example, a passenger may travel through a lobby on their way to the hall to access the elevator system. The method may comprise instructing the controller of the elevator car to move the elevator car to the floor containing the lobby, e.g. in response to the further wireless network access point detecting the probe request. This may, for example, help to speed up the operation of the elevator system by pre-emptively moving elevator cars to a floor where the presence of one or more potential passengers is detected.

The method may comprise the wireless access point listening for at least one subsequent probe request transmitted by the portable device. The method may comprise the wireless access point detecting at least one subsequent probe request transmitted by the portable device. The method may comprise the at least one processor determining that a subsequent probe request has been detected. The method may comprise the at least one processor determining that a subsequent probe request has not been detected, e.g. after expiry of a time limit following detection of a detected probe request. For example, the wireless network access point may detect a plurality or series of probe requests from a passenger's portable device while a passenger is in the elevator car, and then when the passenger has exited the elevator car, the wireless network access point may stop detecting probe requests from that passenger's portable device. The method may comprise the at least one processor determining that the passenger has exited the elevator car, e.g. in response to the at least one processor determining that a subsequent probe request has not been detected. The method may comprise the at least one processor determining a floor on which the passenger exited the elevator car, e.g. wherein the floor on which the passenger exited the elevator car is determined to be the floor on which the elevator car was located at the time that the at least one processor determining that a subsequent probe request had not been detected.

The method may comprise displaying an indication of the anticipated destination floor. For example, where the elevator car comprises a floor-selection panel comprising buttons, the floor-selection panel may indicate the anticipated destination floor by illuminating the button corresponding to the anticipated destination floor. This may enable the passenger (e.g. in the case that the passenger is a person) to see that the elevator car will be travelling to their destination floor. It may also allow the passenger to notice if the anticipated destination floor is incorrect. The method may comprise receiving input from the passenger (e.g. via the floor-selection panel) to override the anticipated destination floor or to add a destination floor. For example, the method may comprise receiving an input destination floor from an elevator-calling device (e.g. rather than from the portable device) to override the anticipated destination floor or to add a destination floor. The anticipated destination floor may be automatically cancelled in response to receiving an input destination floor (e.g. if there is only one passenger). The input destination floor may be added without cancelling the anticipated destination floor (e.g. if there are multiple passengers, as it may not be possible to determine which passenger's anticipated destination floor should be cancelled). It may be possible for a passenger to cancel an anticipated destination floor (e.g. by pushing the corresponding button).

In some circumstances, a passenger may exit on a different floor from the anticipated destination floor without providing any input to override the anticipated destination floor. For example, if the passenger is travelling in the elevator car at the same time as a second passenger, the passenger might exit the elevator car with the second passenger before the passenger's anticipated destination floor is reached. The method may comprise detecting that the passenger has exited the elevator car at a different floor from the anticipated destination floor. This determination may be made even if input to override the anticipated destination floor has been provided.

The method may comprise updating the matching passenger profile (i.e. the profile corresponding to the passenger) based on the input received to override the anticipated destination floor or to add a destination floor and/or in response to determining the passenger has exited the elevator car at a different floor from the anticipated destination floor. In this way, the elevator system may learn about the passenger's routine, typical behaviours and usual destination(s) to build up and refine the profile to help the elevator system predict future intended destination floor with improved reliability.

Using input from the passenger may help to identify more reliably the correct destination floor for learning purposes, in particular if there is only one passenger in the elevator car. This is because, when there is only one passenger, it can be known with certainty which passenger provided input to override the anticipated destination.

Using a determination of the different floor on which the passenger exited may help to identify more reliably which passenger exited on an unpredicted floor for learning purposes, in particular if there are multiple passengers in the elevator car. This is because, when there are multiple passengers, it may not be possible to infer which passenger provided input to add their correct intended destination floor. Detecting the actual floor of departure for each passenger can allow the elevator system to determine which passenger exited on a different floor from their anticipated destination floor.

It will be appreciated from the present disclosure that using multiple wireless network access points in different locations may provide improved performance of the elevator system and/or may provide improve learning of passenger behaviour and intended destinations.

For example, providing a wireless network access point in a lobby and/or elevator hall may allow an elevator car to be called more quickly for passengers who are in the hall and therefore might intend to travel in the elevator car, while the provision of an additional wireless network access point in the elevator car may allow the elevator system to more accurately identify all of the destination floors for the passengers that actually board the elevator car.

For example, if a wireless network access point in an elevator hall on the 5th floor of a building detects probe request from four devices, it might be determined, for example, that two passengers may intend to travel down to the 1st and 3rd floors, and that two passengers may intend to travel up to the 7th and 9th floors. A processor in the elevator system may then instruct a group controller to send two elevator cars to the elevator hall, with one displaying a "going down" indication and the other displaying a "going up" indication. However, it might be that one of the passengers does not intend to use the elevator system, and only three of the passengers board the elevator cars.

The wireless network access point in the "going up" elevator car might detect probe requests from the portable devices of the two passengers, and (following the method of the present disclosure) it may be determined that the passengers' anticipated floors are the 7th and 9th floors. The elevator car may then transport the passengers to those floors.

However, the wireless network access point in the "going down" elevator car might detect a probe request from only one portable device. Following the method of the disclosure, it may be determined that the probe request matches a profile of a passenger whose anticipated destination floor is determined to be the 1st floor. The elevator car may then travel to the 1st floor, but may do so without stopping at the 3rd floor, which was the anticipated destination floor for the passenger whose portable device was detected in the hall but not in the elevator car (indicating that they did not board the elevator car).

Providing wireless network access points in elevator halls on floors served by an elevator car in addition to a wireless network access point in the elevator car may help the elevator system to determine more accurately the floor on which a passenger exited the elevator car. For example, if the wireless network access point in the elevator car detects a probe request from a passenger's portable device, and then at (for example) the 4th floor, does not receive any further probe requests from that portable device, it may be inferred that the passenger exited the elevator car on the 4th floor. If the wireless network access point on the 4th floor then receives a probe request from that passenger's portable device, this can provide confirmation that the passenger exited at the 4th floor. This may help to improve the elevator system's ability to learn about passengers' usual destination floors to correct and/or refine passenger profiles.

The method and elevator system of the present disclosure may be used for multiple passengers at the same time. For example, there may be multiple passengers waiting in an elevator hall. Respective probe requests from the passengers' portable devices may be detected by a wireless network access point in the elevator hall and an elevator car may be called for the passengers. When the passengers board the elevator car, a wireless network access point in the elevator car may detect a probe request from each passenger's portable device. A respective matching passenger profile may be identified for each passenger and a respective anticipated destination floor may be identified for each passenger. The elevator car may then travel to each of the anticipated destination floors in a suitable order.

The elevator system may comprise more than one elevator car, e.g. with each elevator car travelling in a respective elevator hoistway. Each elevator car may be configured to be controlled by the method of the present disclosure. The method of the present disclosure may be carried out by each elevator car in the elevator system. Each elevator car in the elevator system may have any or all of the features and functions of the elevator car as disclosed above. A wireless network access point may be provided in each elevator car. One or more wireless network access points may also be provided in elevator halls and/or in lobbies in the way described above.

Each elevator car may be controlled by a respective controller. One controller in the elevator system may be a group controller, i.e. a master controller that coordinates the operation of the elevator cars in the elevator system, e.g. by communicating with and sending instructions to the other controllers.

In examples wherein one or more wireless network access points are provided in elevator halls or lobbies e.g. on each floor, the wireless network access points may be used in the way described above to detect the presence of one or more passenger(s) by detecting one or more probe requests transmitted by the portable device(s) carried by the passenger(s). One or more elevator cars may be called to an elevator hall in response to detecting the presence of one or more passengers' portable devices in the elevator hall or in a lobby.

The at least one processor may use the wireless network access point in the elevator hall or lobby to cooperate with the group controller of the elevator cars to coordinate calling of one or more elevator cars for the passenger(s). For example, the at least one processor may determine a number of passengers in a lobby or elevator hall and the group controller may call a number of elevator cars that is dependent on the determined number of passengers. As another example (not mutually exclusive with the previous example), the at least one processor may identify a respective matching passenger profile for each passenger whose portable device is detected in an elevator hall and may determine respective anticipated destination floors for each passenger. The group controller may call a number of elevator cars (e.g. a number of elevator cars designated to go up and/or a number of elevator cars designated to go down) based on how many and/or which floors are identified as anticipated destination floors for the passengers.

When one or more passengers are in the elevator car, the method of the present disclosure, as described above, may be used to determine an anticipated destination floor for the or each passenger and to transport the passenger(s) to the anticipated destination floor(s). Any or all optional features described above in relation to the elevator car in may be provided for each elevator car where applicable.

The data storage may consist of a single memory. For example, the passenger profiles may be stored in a single memory that is accessible by the at least one processor from multiple locations, e.g. there may be a respective processor in each elevator car and/or in each elevator hall. For example, a processor may be provided for (e.g. and located with) each wireless network access point in the elevator system. Each processor may be able to access the single memory to access to the passenger profiles (e.g. to use them to identify a matching passenger profile and/or to create or update a passenger profile). The single memory may be, for example, in one of the elevator cars, in an elevator hall, on a remote server, or in the cloud.

Alternatively, the data storage may comprise multiple memories and the passenger profiles may be stored in the multiple memories. For example, a respective memory and a respective processor may be provided for (e.g. and located with) each wireless network access point in the elevator system. One of the memories may be designated a master memory and may store a definitive version of the plurality of passenger profiles. Alternatively, a further memory on a remote server or in the cloud may be a master memory that stores a definitive version of the plurality of passenger profiles. The further memory may be (but is not necessarily) part of the data storage as defined above. The plurality of passenger profiles stored in each memory (or in each other memory) may be synchronized with the plurality of passenger profiles in the master memory (e.g. synchronization may make place each time a passenger profile is created or updated). Each processor may access and use the plurality of passenger profiles in its respective memory when identifying a matching passenger profile in accordance with the disclosed method.

The method may further comprise the wireless network access point detecting a new probe request from a further portable device carried by a further passenger, wherein the new probe request contains at least a first new probe request data set and wherein the first new probe request data set is of the first type. The at least one processor may determine that no matching passenger profile exists for which the first passenger profile data set matches the first new probe request data set. The at least one processor may create a new passenger profile in the data storage, wherein the new passenger profile includes a first new passenger profile data set which comprises the first new probe request data set. The further passenger may input a destination floor and/or the at least one processor may determine (e.g. using a wireless network access point in the elevator car or on a floor served by the elevator system) a floor on which the further passenger exited the elevator car. The at least one processor may update the new passenger profile based on the input destination floor and/or the floor on which the further passenger exited the elevator car.

For any passenger profile in the data storage, the at least one processor may update the matching passenger profile for the passenger based on input provided by the passenger (e.g. to override or cancel an anticipated destination floor or to add a destination floor) and/or based on a determination of a floor on which the passenger exited the elevator car. This may include updating the matching passenger profile after making a determination that the passenger exited the elevator car at the anticipated destination floor (e.g. confirming that the anticipated destination floor was correctly determined). The at least one processor may update the new passenger profile for the further passenger in a similar way.

The present method has been disclosed in the context of an elevator system having certain structural features, including but not limited to controllers, at least one processor, wireless network access points, and optionally data storage. Unless explicitly stated otherwise, there is no limitation on where these structural features may be positioned or how they may be distributed within the elevator system. Where the elevator system is described as "comprising" a feature, that does not necessarily imply that said feature must be provided in or on the elevator car or within an elevator hoistway of the elevator system. For example, a feature may be provided in an elevator hall or lobby, e.g. in communication with other features that form part of the elevator system.

Some examples have been given for where one or more wireless network access points may be located, but the disclosure is not limited to these specific locations.

In particular, it is to be understood that the at least one processor may comprise a single processor or a plurality of processors. The plurality of processors may be distributed in different locations in the elevator system, e.g. there may be a processor in the or each elevator car; there may be a processor provided with each wireless network access point; there may be a processor provided in each elevator hall and/or each elevator lobby. Each elevator car may be provided with a communications control board comprising a wireless network access point and a processor.

When one or more steps are described as being carried out by the at least one processor, it is to be understood that this means that where the at least one processor comprises a plurality of processors, each step may be carried out by any one of the plurality of processors (i.e. different steps may be carried out by a different processor of the plurality of processors). In particular, where the at least one processor comprises a plurality of processors, it is to be understood that when a step is described as being carried out by the at least one processor, this does not imply that the step must be carried out by each processor of the plurality of processors.

In addition, as mentioned above, it is to be understood that the data storage may comprise a single memory or a plurality of memories. The plurality of memories may be distributed in different locations in the elevator system, e.g. there may be a memory in the or each elevator car; there may be a memory provided with each wireless network access point; there may be a memory provided in each elevator hall and/or each elevator lobby. The data storage or part of the data storage (e.g. the single memory or one or more memories of the data storage) may be located remotely from the elevator system, e.g. on a remote server or in the cloud. In examples in which the elevator system comprises the data storage, the data storage may be used in conjunction with one or more additional memories that do not form part of the elevator system (e.g. wherein a master memory is provided remotely from the elevator system, e.g. on a remote server or in the cloud). Each elevator car may be provided with a communications control board comprising a wireless network access point and a memory (e.g. in addition to a processor provided on the communications control board). The data storage may comprise one or more non-transitory computer-readable media. The computer-readable medium having the instructions stored therein may be a non-transitory computer-readable medium.

When it is said that the plurality of passenger profiles is stored or contained in the data storage, it is to be understood that where the data storage comprises a plurality of memories, this may mean a copy of the plurality of passenger profiles is stored in one, some or all of the memories. When it is said that the data storage has stored therein a plurality of passenger profiles and that the computer-readable medium has stored therein instructions which, when executed by the at least one processor, cause the at least one processor to carry out method steps, it is to be understood that the plurality of passenger profiles may be stored in a memory that is separate from the computer-readable medium that stores the instructions. For example, each elevator car could each be provided with two memories, wherein one of the two memories stores the plurality of passenger profiles and the other memory is the computer-readable medium that stores the instructions. However, this is not essential and in some alternative examples, the plurality of passenger profiles and the instructions are both stored in the computer-readable medium (i.e. such that the computer-readable medium is or forms part of the data storage).

Some features may be integrated, e.g. the or each wireless network access point may comprise a processor and/or a memory that stores the plurality of passenger profiles.

Any optional features described with reference to the method of the present disclosure may be features of the elevator system, and vice versa.

DRAWING DESCRIPTION

Certain preferred examples of this disclosure will now be described, by way of example only, with reference to the accompanying drawings, in which.

DETAILED DESCRIPTION

Figure 1:
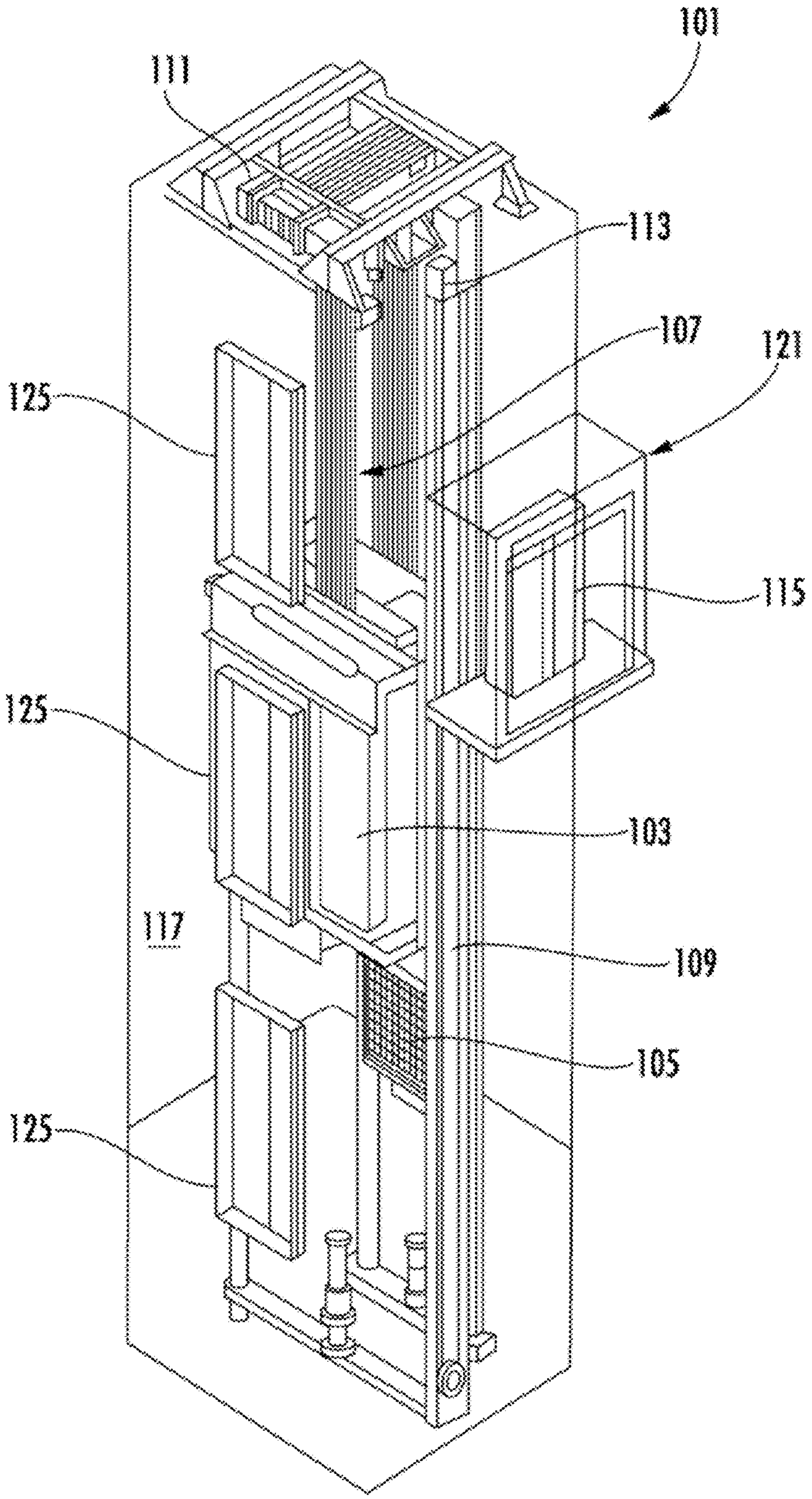
FIG. 1 shows a schematic illustration of an elevator system that may be used in various examples in accordance with the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other examples, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with examples of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including a tension member 107, elevator systems that employ other methods and mechanisms of moving an elevator car within an elevator hoistway may employ examples of the present disclosure. For example, examples may be employed in ropeless elevator systems using a linear motor to impart motion to an elevator car. Examples may also be employed in ropeless elevator systems using a hydraulic lift to impart motion to an elevator car. FIG. 1 is merely a non-limiting example presented for illustrative and explanatory purposes.

Figure 2:
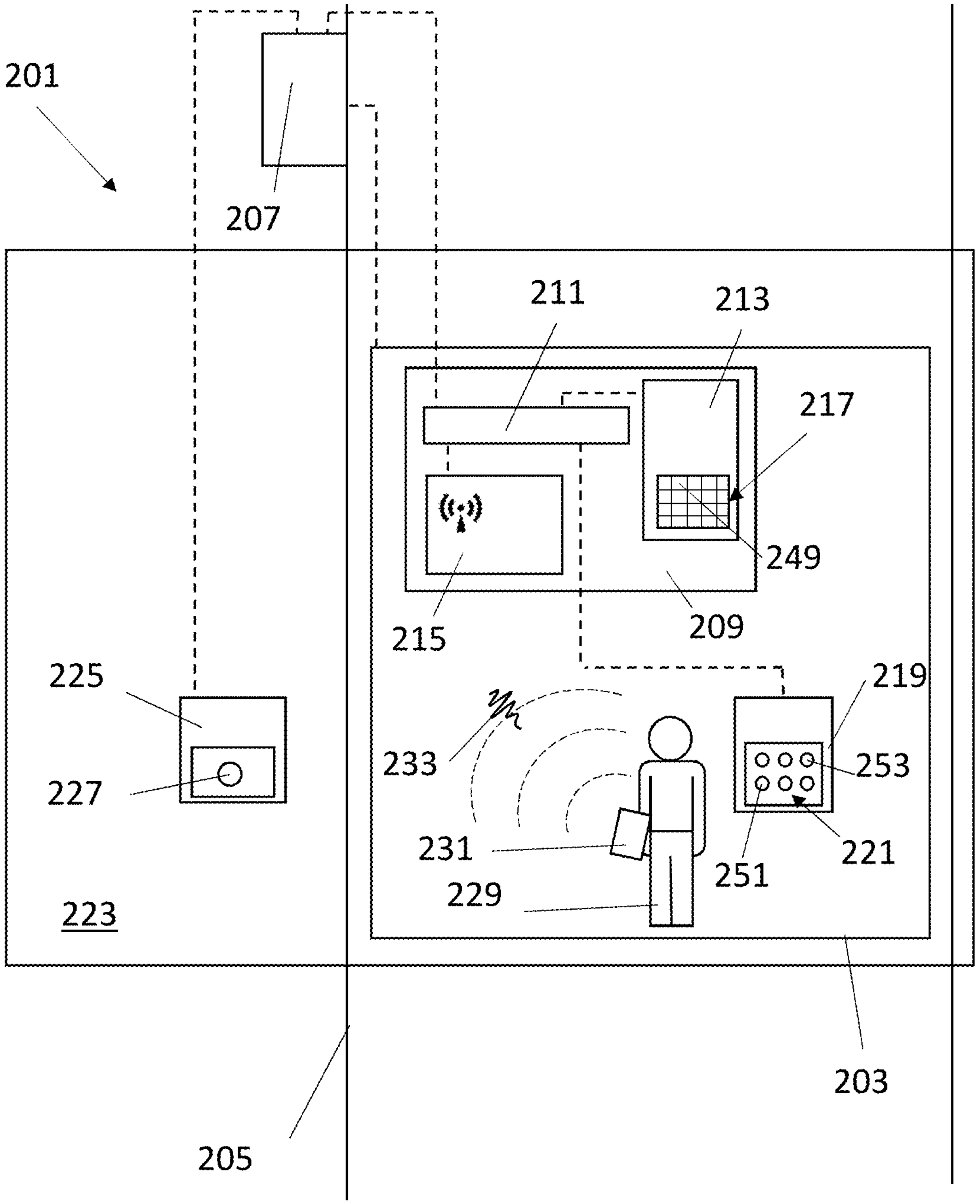
FIG. 2 shows a schematic illustration of a first example of an elevator system in accordance with the present disclosure.

FIG. 2 shows a schematic illustration of a first example of an elevator system 201 in accordance with the present disclosure. The elevator system 201 may for example incorporate the structure of the elevator system 101 depicted in FIG. 1, although this is not essential.

The elevator system 201 comprises an elevator car 203 operating within a vertical elevator hoistway 205 between floors in a building. The elevator car 203 is controlled by a controller 207 that is positioned in a control room (omitted for clarity) adjacent to the elevator hoistway 205.

The elevator car 203 comprises a communications control board 209. The communications control board 209 comprises a processor 211, a memory 213 that is accessible by the processor 211, and a wireless network access point 215 in communication with the processor 211. In this example, the wireless network access point 215 is a Wi-Fi access point (hereafter "Wi-fi AP"). Stored in the memory 213 is a plurality of passenger profiles 217. Although in this example, the plurality of passenger profiles 217 is stored in the memory 213 that is part of the elevator system 201, in other examples and in variations on this example, the plurality of passenger profiles 217 may be stored in a memory that is not part of the elevator system 201, e.g. on a remote server or in the cloud.

The elevator car 203 also comprises a floor-selection panel 219 in communication with the processor 211. The floor-selection panel 219 comprises a number of buttons 221 corresponding to floors served by the elevator system 201, which a passenger can press to select a floor for the elevator car 203 to travel to.

The elevator car 203 is accessible via an elevator hall 223. In the elevator hall 223 there is an elevator-calling panel 225 comprising a button 227 for summoning an elevator car 203. The elevator-calling panel 225 is in communication with the controller 207.

A passenger 229 in the elevator hall 223 wishing to use the elevator system 201 can summon an elevator car 203 by pressing the button 227. When the passenger 229 pushes the button 227, the elevator-calling panel 225 communicates with the controller 207, which controls the elevator car 203 to move it to the floor where elevator-calling panel 225 is located. When the elevator car 203 arrives at the floor, the passenger 229 enters the elevator car 203.

The passenger 229 is carrying a portable device 231 which is Wi-fi-enabled, i.e. it is capable of connecting to a Wi-Fi network. The portable device 231 continually transmits probe requests 233 for the purpose of network discovery, e.g. in accordance with the IEEE 802.11 WLAN protocol.

Figure 3:
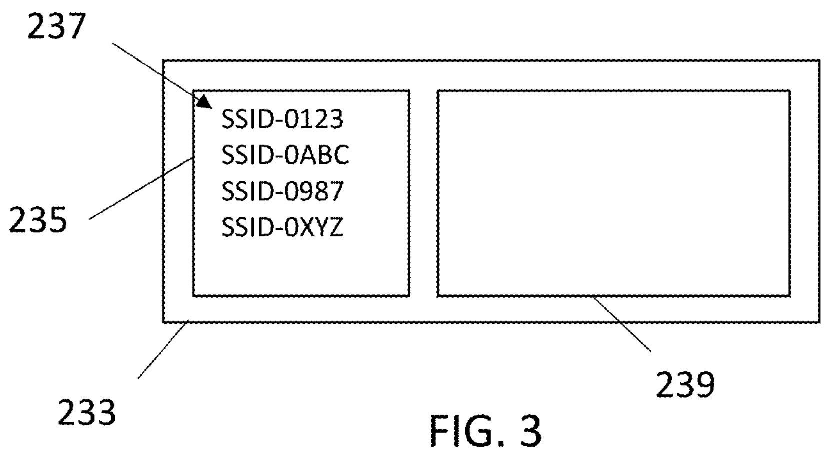
FIG. 3 shows an illustration representing a probe request that may be employed in methods and elevator systems in accordance with the present disclosure.

When the passenger 229 is in the elevator car 203, the Wi-Fi AP 215 detects a probe request 233 transmitted by the portable device 231. The content of the probe request 233 is represented schematically in FIG. 3. The probe request 233 comprises a first probe request data set 235, which comprises a list of Service Set Identifiers (SSIDs) 237 corresponding to Wi-Fi networks known to the portable device 231 (e.g. to which the portable device 231 has previously connected). The probe request 233 may comprise other data 239, e.g. which may be intended for use in establishing a network connection.

Figure 4:
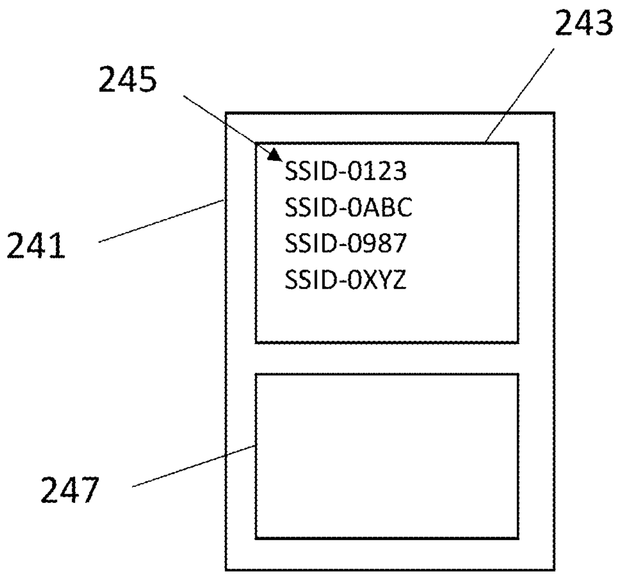
FIG. 4 shows an illustration representing an example passenger profile that may be employed in methods and elevator systems in accordance with the present disclosure.

The Wi-Fi AP 215 communicates the list of SSIDs 237 to the processor 211. The processor 211 accesses the plurality of passenger profiles 217 in the memory 213. The content of an example passenger profile 241 is represented schematically in FIG. 4. The example passenger profile 241 comprises first passenger profile data 243 which comprises an SSID list 245 that was previously received via a probe request from a corresponding portable device carried by a passenger. The passenger profile is thereby associated with the passenger carrying the corresponding portable device. The example passenger profile 241 also comprises second passenger profile data 247 representing at least one destination floor. For example, the second passenger profile data 247 may include a list of destination floors with frequency data indicating how frequently the passenger visits each floor. As another example, the second passenger profile data 247 may include a list of days and times, with an indication of the most frequently visited destination floor for the corresponding day and time. These are just two non-limiting examples of data that may be included in the second passenger profile data 247 and other examples are possible.

The processor 211 compares the list of SSIDs 237 from the probe request 233 with the SSID lists 245 of the plurality of passenger profiles 217 in the memory 213 and identifies a matching passenger profile 249 which contains the same SSIDs as the list of SSIDs 237 from the probe request 233. The processor 211 determines from the second passenger profile data 247 that the passenger with whom the passenger profile is associated most frequently visits the 7th floor. The processor 211 then instructs the controller 207 to move the elevator car 203 to the 7th floor. As another example, the processor 211 may determine that the current day and time is Wednesday at 2:30 pm. The processor 211 may determine from the second passenger profile data 247 that on Wednesdays between 2 pm and 3 pm, the passenger's most frequently visited floor is the 4th floor. This situation might arise, for example, if the passenger 229 usually works on the 7th floor but has a regular appointment (e.g. a team meeting) on Wednesdays at 2:30 pm on the 4th floor. Other examples are possible for how a passenger's anticipated destination floor may be determined based on the second passenger profile data 247.

In an alternative scenario in accordance with the method of the present disclosure, the passenger 229 might not intend to go to the 4th floor, even though it is Wednesday at 2:30 pm. For example, they may have joined a different team with a regular meeting on the 3rd floor instead. When the processor 211 determines that the anticipated floor is the 4th floor, the processor 211 may cause the floor-selection panel 219 in the elevator car 203 to indicate the anticipated destination floor, e.g. by illuminating the button 251 corresponding to the 4th floor.

The passenger 229 may see that the button 251 for the 4th floor is illuminated and recognise that the anticipated destination floor needs to be corrected. The passenger 229 may press the button 253 for the 3rd floor to add the 3rd floor as a destination floor. The 4th floor may be automatically cancelled as a destination floor in response to the passenger 229 selecting the 3rd floor, or the passenger 229 might press the button 251 for the 4th floor to cancel it as a destination floor. The elevator car 203 then travels to the 3rd floor.

The processor 211 may update the matching passenger profile 249 to reflect the passenger's input to override the determination of the 4th floor as the anticipated destination floor. For example, the matching passenger profile 249 may be updated to record a change in the frequency of visiting the 4th floor and the 3rd floor during the day and time interval of 2 pm to 3 pm on Wednesdays. If the passenger 229 corrects the destination floor from the 4th floor to the 3rd floor a threshold number of times, the matching passenger profile 249 may be updated so that the 4th floor is indicated to be the anticipated destination floor for the day and time interval of 2 pm to 3 pm on Wednesdays.

In another alternative scenario in accordance with the method of the present disclosure, the passenger 229 may board the elevator car 203 and the processor 211 may determine the 4th floor to be the anticipated destination floor. However, the passenger 229 may board the elevator car 203 with a second passenger who is another, long-standing member of the new team. Following the method of the present disclosure for the second passenger, the processor 211 may determine the 3rd floor to be the anticipated destination floor for the second passenger. The processor 211 may cause the buttons 251, 253 for both the 3rd floor and the 4th floor to be illuminated. The passenger 229 may note that two buttons 251, 253 are illuminated, but may not provide any input via the buttons 221 because their actual intended destination floor (the 3rd floor) is already indicated. Both passengers may exit for their meeting on the 3rd floor.

The passenger's portable device 231 continually transmits probe requests 233 as part of its network discovery protocol. The Wi-Fi AP 215 in the elevator car 203 therefore continues to detect probe requests 233 from the portable device 231 while the portable device 231 is in the elevator car 203. However, when the passenger 229 exits the elevator car 203 on the 3rd floor with the second passenger, the Wi-Fi AP 215 ceases to receive further probe requests from the portable device 231. The processor 211 determines from the Wi-Fi AP 215 that the Wi-Fi AP 215 stopped receiving probe requests when the elevator car 203 was on the 3rd floor. The processor 211 determines that the passenger 229 exited the elevator car 203 on the 3rd floor instead of on the anticipated destination floor which was the 4th floor. The processor 211 may update the matching passenger profile 249 to reflect the determination that the passenger 229 exited on the 3rd floor instead of the anticipated floor.

Figure 5:
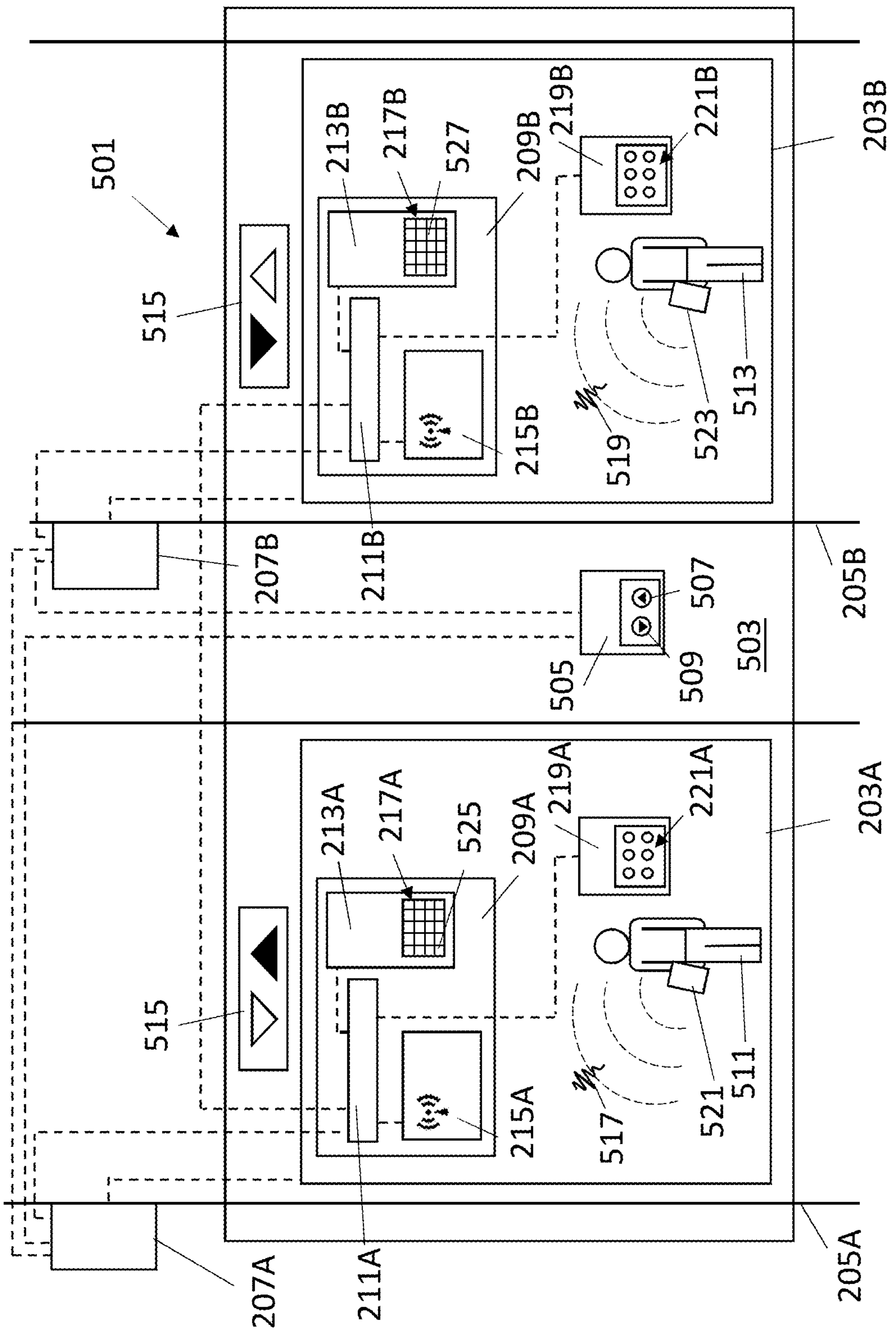
FIG. 5 shows a schematic illustration of a second example of an elevator system in accordance with the present disclosure.

FIG. 5 shows a schematic illustration of a second example of an elevator system 501 in accordance with the present disclosure. The elevator system 501 may for example incorporate the structure of the elevator system 101 depicted in FIG. 1, although this is not essential.

The elevator system 501 comprises first and second elevator cars 203A, 203B operating within respective vertical elevator hoistways 205A, 205B between floors in a building. Each elevator car 203A, 203B is controlled by a respective controller 207A, 207B that is positioned in the respective elevator hoistway 205A, 205B.

Each elevator car 203A, 203B has the same structure and features as the elevator car 203 described with respect to FIG. 2, although this is not essential and variations are possible. Corresponding features of the elevator cars 203A, 203B are labelled with the same reference numerals as in FIG. 2 except that a suffix A or B is added to distinguish between features of the first and second elevator cars 203A, 203B.

One controller 207A is designated a "group controller" or master controller, and is used to coordinate movement of the elevator cars 203A, 203B, for example in response to an elevator call summoning one of the elevator cars 203A, 203B for use by a passenger.

One memory 213A is designated the master memory, and contains a definitive version of the plurality of passenger profiles 217A. The other memory 213B is synchronized to the master memory 213A, i.e. to bring the content of the other memory 213B into conformity with the content of the master memory 213A (e.g. periodically or in response to a change in the content of the master memory 213A). Although in this example one memory 213A of the memories 213A, 213B is designated the master memory, in other examples and in variations on this example, a different memory (e.g. on a remote server or in the cloud) may serve as a master memory. It is to be understood that in this example, the memories 213A, 213B in the elevator cars 203A, 203B together constitute "data storage" as discussed above.

The elevator system 501 is accessible via an elevator hall 503. In the elevator hall 503, there is an elevator-calling panel 505. However, in this example, the elevator-calling panel 505 comprises a 'go up' button 507 and a 'go down' button 509. Passengers 511, 513 in the elevator hall wishing to use the elevator system 501 can summon one of the elevator cars 203A, 203B by pressing the 'go up' button 507 or the 'go down' button 509, depending on whether they wish to travel up or down relative to their current floor. Providing a 'go up' button 507 and a 'go down' button 509 instead of a single button for summoning one of the elevator cars 203A, 203B may help the group controller 207A to coordinate the movement of the elevator cars 203A, 203B, e.g. sending only one car if multiple passengers wish to travel in the same direction and sending two cars if the passengers wish to travel in different directions.

When the passengers 511, 513 have summoned an elevator car using the elevator-calling panel 505, the group controller 207A sends the appropriate number of elevator cars 203A, 203B to the floor where the elevator-calling panel 505 is located. An indicator 515 over each elevator access door (omitted for clarity) may indicate each elevator car's designated direction of travel to help the passengers 511, 513 board the correct elevator car.

The passengers 51, 513 board the elevator cars 203A, 203B. The Wi-Fi AP 215A, 215B in each elevator car 203A, 203B detects respective probe requests 517, 519 transmitted by portable devices 521, 523 carried by the passengers 511, 513, and determines an anticipated destination floor for each passenger 511, 513 in the same manner as described above with respect to FIG. 2. The controller 207A, 207B for each elevator car 203A, 203B moves the respective elevator car 203A, 203B to each anticipated destination floor of the passengers 511, 513 in said elevator car 203A, 203B in an appropriate order.

The passengers 511, 513 may override or cancel the anticipated destination floor or add a new destination floor in the same manner as described above with respect to FIG. 2. The processor 211A, 211B in each elevator car 203A, 203B may use the Wi-Fi AP 215A, 215B in the respective elevator car 203A, 203B to determine on which floor each passenger 511, 513 exits the elevator car 203A, 203B in the same manner as described above with respect to FIG. 2. The processors 211A, 211B may determine that the passengers 511, 513 left on their respective anticipated destination floor or on a different floor.

The processor 211A, 211B in each elevator car 203A, 203B may update the passenger profile 525, 527 for each passenger 511, 513 in the elevator cars 203A, 203B at the master memory 213A, based on any input from the passengers 511, 513 (e.g. overriding or cancelling the anticipated destination floor or adding a destination floor) or based on the respective floor on which each of the passengers 511, 513 exited the elevator cars 203A, 203B. The other memory 213B may be synchronized to the master memory 213A, e.g.

in response to the master memory 213A being updated or during a periodic synchronization process.

Figure 6:
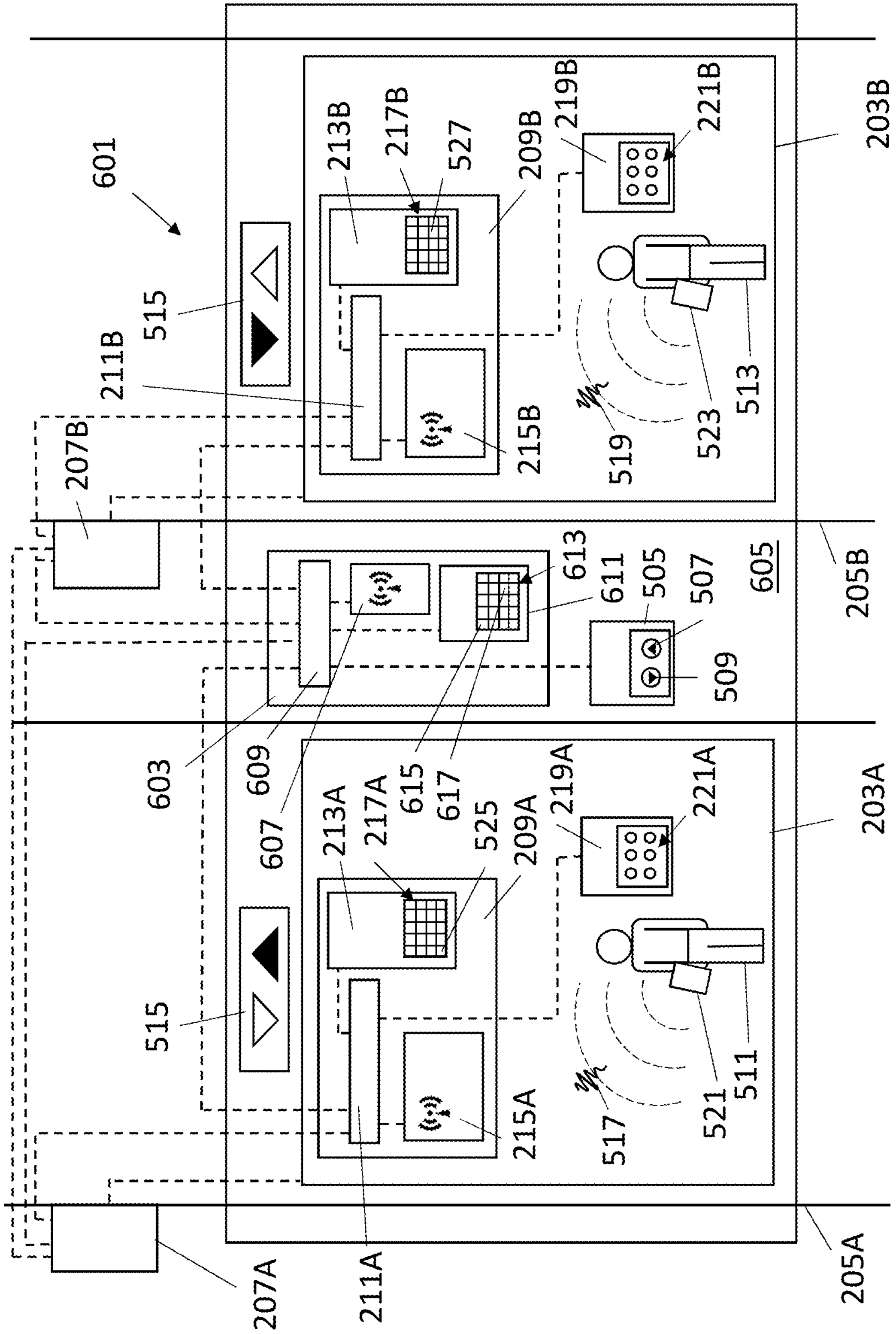
FIG. 6 shows a schematic illustration of a third example of an elevator system in accordance with the present disclosure.

FIG. 6 shows a schematic illustration of a third example of an elevator system 601 in accordance with the present disclosure. The elevator system 601 has the same structure and features as the elevator system 501 depicted in FIG. 5, except that in the example of FIG. 6 there is a communications control board 603 in the elevator hall 605 on each floor. The communications control board 603 comprises a Wi-Fi AP 607, a processor 609 and a memory 611. The memory 611 has stored therein a copy 613 of the plurality of passenger profiles 217A, 217B that is also stored in each memory in each elevator car 203A, 203B. It is to be understood that in this example, the memories 213A, 213B in the elevator cars 203A, 203B together with the memory 611 in the elevator hall 605 on each floor constitute the "data storage" as discussed above.

Features depicted in FIG. 6 that are the same as corresponding features depicted in FIG. 5 are labelled with the same reference numerals.

Similarly to the example of FIG. 5, one of the memories 213A, 213B, 611 is designated the master memory (e.g. the memory 611 on an entrance-level floor) and the other memories 213A, 213B are synchronized with the master memory 611 (e.g. periodically or in response to a change in the data stored in the master memory 611). Although in this example, the memory 611 is designated the master memory, in variations on this example and in other examples, a different memory e.g. that is separate from the elevator system (e.g. on a remote server or in the cloud) may serve as a master memory.

In this example, the Wi-Fi AP 607 in the elevator hall 605 may be used to automatically call one or more elevator cars 203A, 203B for one or more passengers 511, 513 in the elevator hall 605.

For example, two passengers 511, 513 may arrive in the elevator hall 605, carrying respective portable devices 521, 523. Each portable device 521, 523 continually transmits probe requests 517, 519 according to a network discovery protocol, wherein each probe request 517, 519 contains a list of SSIDs for the respective portable device 521, 523. The Wi-Fi AP 607 detects a probe request 517, 519 from each portable device 521, 523, and in a similar manner to that described above with reference to FIG. 2, the processor 609 in the elevator hall 605 uses the list of SSIDs to identify a respective matching passenger profile 615, 617 for each passenger 511, 513 from the plurality of passenger profiles 613 in the memory 611. The processor 609 determines a respective anticipated destination floor for each passenger 511, 513 based on the respective matching passenger profile 615, 617.

The processor 609 communicates with the group controller 207A to indicate the required number of elevator cars 203A, 203B. In this example, the two passengers 511, 513 arrive in the elevator hall 605 on the 3rd floor. The anticipated destination floor for one passenger 511 is the 1st floor and the anticipated destination floor for the other passenger 513 is the 5th floor. The processor 609 communicates to the group controller 207A that an elevator car 203A to go down and an elevator car 203B to go up are required. The group controller 207A coordinates sending elevator cars 203A, 203B accordingly.

When the elevator cars 203A, 203B arrive, an indicator 515 above each elevator car 203A, 203B indicates the designated direction of travel for each elevator car 203A, 203B and the passengers 511*m* 513 board the elevator cars 203A, 203B.

In some variations and alternative scenarios, the processor 609 may communicate the anticipated destinations floors to the respective processors 211A, 211B in each elevator car 203A, 203B. The processor 211A, 211B in each elevator car 203A, 203B may then instruct the respective controller 207A, 207B for each elevator car 203A, 203B to move the elevator car 203A, 203B to the respective anticipated destination floor. This approach may be applicable, for example, when only one elevator car is required (as it may be assumed that the one elevator car should visit all anticipated destination floors). However, in this example involving using two elevator cars 203A, 203B, there is a possibility that a passenger 511, 513 may board the wrong elevator car 203A, 203B. There is also a possibility that a passenger may be detected in the elevator hall 605 who does not intend to travel.

In this example, to help to ensure that the correct floors are visited, the Wi-Fi AP 215A, 215B in each elevator car 203A, 203B detects a probe request 517, 519 from the portable device 521, 523 of the passenger 511, 513 in the respective elevator car 203A, 203B, and determines an anticipated destination floor for the respective passenger 511, 513 in the same manner as described above with reference to FIG. 2. As the probe requests 517, 519 from any given portable device 521, 523 all contain the same SSID list as each other probe request 517, 519 from the same portable device 521, 523, for each passenger 511, 513, the matching passenger profile 525, 527 identified by the processor 211A, 211B in the elevator car 203A, 203B will be the same as the matching passenger profile 615, 617 identified by the processor 609 in the elevator hall 605. Therefore, for each passenger 511, 513, the respective processor 211A, 211B in the elevator car 203A, 203B will determine the same anticipated destination floor as was determined by the processor 609 in the elevator hall 605. However, by repeating the determination of the anticipated destination floor based on the probe request 517, 519 detected by the Wi-Fi APs 215A, 215B in the elevator cars 203A, 203B, it can be checked which elevator car 203A, 203B contains which passenger 511, 513 and therefore which anticipated destination floor each elevator car 203A, 203B should visit.

Each passenger 511, 513 may override or cancel the anticipated destination floor or add a new destination floor in the same manner as described above with respect to FIG. 2.

The processor 211A, 211B in each elevator car 203A, 203B may use the Wi-Fi AP 215A, 215B in the respective elevator car 203A, 203B to determine on which floor each passenger 511, 513 exits the elevator car 203A, 203B in the same manner as described above with respect to FIG. 2. However, as noted above, there is a Wi-Fi AP 607 in the elevator hall 605 of each floor. Therefore, in this example, additionally or alternatively, the Wi-Fi AP 607 in the elevator hall 605 on the floor on which each passenger 511, 513 exits the respective elevator car 203A, 203B may detect a probe request 517, 519 from the respective passenger's portable device 521, 523. The processor 609 in the or each elevator hall 605 may identify the matching passenger profile 615, 617 corresponding to the respective probe request 517, 519. The processor 609 may then make a determination that the passenger 511, 513 exited the elevator car 203A, 203B on the floor where the probe request 517, 519 was detected by the Wi-Fi AP 607. This may confirm or correct the determination of the floor on which each passenger 511, 513 exits the elevator cars 203A, 203B, as determined using the Wi-Fi APs 215A, 215B in the elevator cars 203A, 203B. For example, if there is a relatively long delay between probe requests 517, 519 transmitted by a portable device 521, 523, there may be ambiguity concerning which floor the elevator car 203A, 203B was on when the passenger 511, 513 exited the elevator car 203A, 203B.

After the floor on which each passenger 511, 513 exited has been determined, the processor 211A, 211B in the elevator car 203A, 203B may update the matching passenger profile 525, 527 for each passenger 511, 513 in the master memory 611 (e.g. via the processor 609 in the elevator hall 605). The other memories 213A, 213B may then by synchronized with the master memory 611 to reflect the update.

In an alternative scenario involving the example elevator system of FIG. 6, when the passengers 511, 513 first arrive in the elevator hall 605 to use the elevator system 601, the Wi-Fi AP 607 in the elevator hall 605 may detect a probe request 517 from a passenger's portable device 521, but the processor 609 may determine that no matching passenger profile exists in the plurality of passenger profiles 613 in the memory 611.

In this situation, the elevator-calling panel 505 may indicate to the passenger 511 that they should use the elevator-calling panel 505 to summon an elevator car 203*a*, 203B (e.g. by illuminating a light on the elevator-calling panel 505). This may help to avoid unnecessary elevator calls resulting from people passing through the elevator hall 605 that do not typically visit the floors served by the elevator system 601. Alternatively, the processor 609 may instruct the group controller 207A to send an elevator car 203A to the elevator hall 605, e.g. without indicating the direction of travel.

When an elevator car 203A arrives, the passenger 511 may enter, and the Wi-Fi AP 215A in the elevator car 203A may detect a probe request 517 from the passenger's portable device 521. The processor 211A in the elevator car 203A may use an SSID list from the probe request 517 to try to identify a matching passenger profile but determine that no matching passenger profile exists. The floor-selection panel 219A may indicate to the passenger 511 that they should select a floor (e.g. by illuminating a light on the floor-selection panel 219A). The passenger 511 selects a floor and the controller 207A moves the elevator car 203A to the selected floor.

The processor 211A in the elevator car 203A may then create a new passenger profile for the passenger 511, including adding the SSID list from the probe request 517 to the new passenger profile and adding information relating to the selected destination floor. The new passenger profile may be updated with each subsequent use of the elevator system 601 by the passenger 511 to build and refine the new passenger profile.

It will be appreciated that examples involving two elevator cars may be extended to more than two elevators cars.

Figure 7:
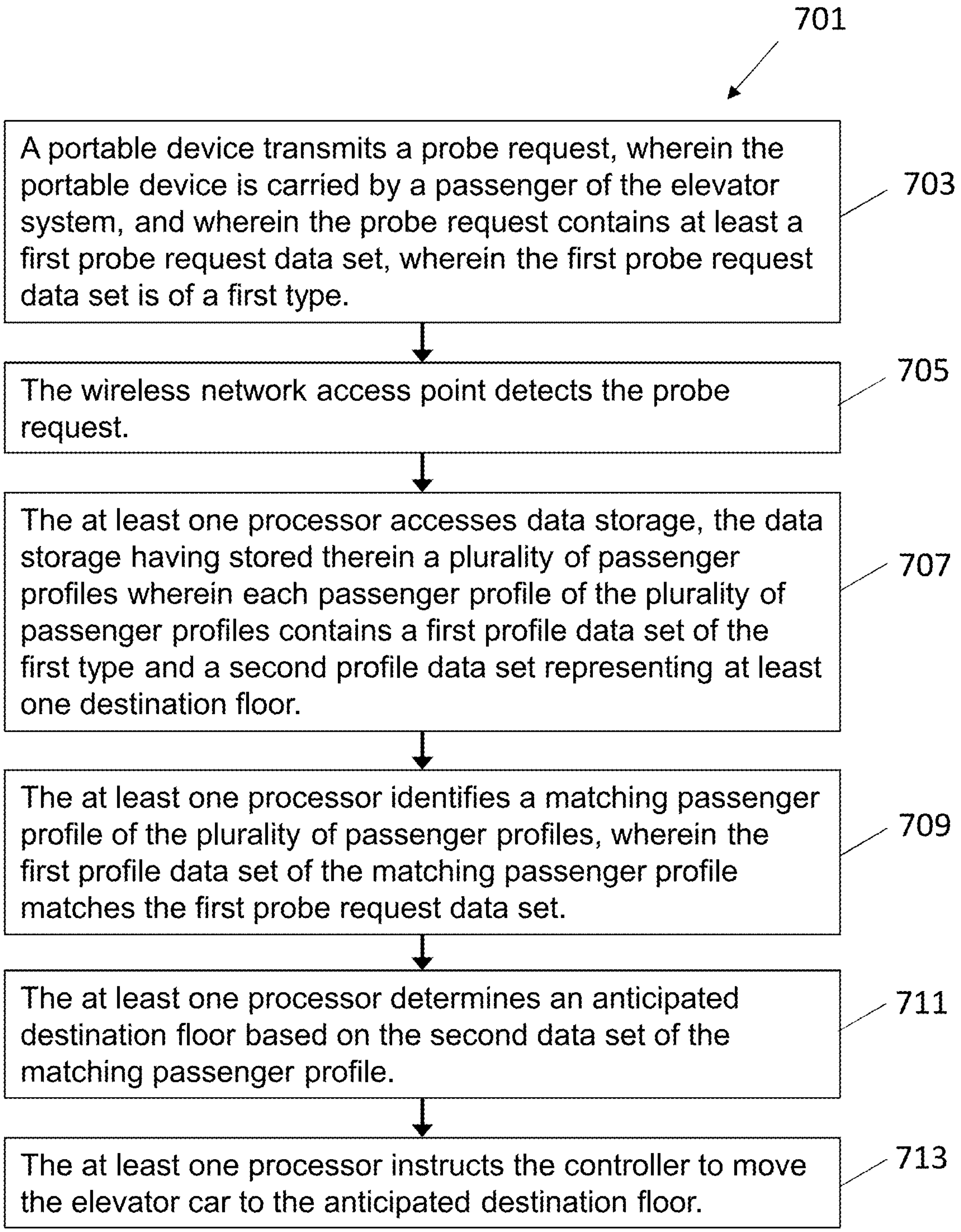
FIG. 7 shows a flowchart illustrating a method in accordance with the present disclosure.

FIG. 7 shows a flow chart illustrating an example method 701 in accordance with the present disclosure. The method 701 may be used to control an elevator car in an elevator system. The elevator car may be, for example, any of the elevator cars described above with reference to FIG. 1, FIG. 2, FIG. 5 or FIG. 6 above. However, this is not essential and the method may be used to control any elevator car in accordance with the present disclosure.

The method 701 of FIG. 7 is a method of controlling an elevator system comprising a controller for the elevator car, at least one processor, and a wireless network access point.

The method comprises a step 703 of a portable device transmitting a probe request, wherein the portable device is carried by a passenger of the elevator system, and wherein the probe request contains at least a first probe request data set, wherein the first probe request data set is of a first type.

The method comprises a step 705 of the at least one processor accessing data storage, the data storage having stored therein a plurality of passenger profiles wherein each passenger profile of the plurality of passenger profiles contains a first profile data set of the first type and a second profile data set representing at least one destination floor.

The method comprises a further step 707 of the wireless network access point detecting the probe request.

The method comprises a further step 709 of the at least one processor identifying a matching passenger profile of the plurality of passenger profiles, wherein the first profile data set of the matching passenger profile matches the first probe request data set.

The method comprises a further step 711 of the at least one processor determining an anticipated destination floor based on the second profile data set of the matching passenger profile.

The method comprises a further step 713 of the at least one processor instructing the controller to move the elevator car to the anticipated destination floor.

The method may comprise one or more additional steps in addition to the steps depicted in FIG. 7. The additional step(s) may each occur before, after or in between any of the steps depicted in FIG. 7.

It will be appreciated that although the passengers mentioned in the above examples may be people, the passengers may also be non-human (e.g. animals/pets, robots, objects, etc.), e.g. in variations on these examples and in other examples.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A method of controlling an elevator car (203; 203A; 203B) in an elevator system (201, 501, 601), wherein the elevator system (201, 501, 601) comprises a controller (207; 207A; 207B) for the elevator car (203; 203A; 203B), at least one processor (211; 211A, 211B, 609), and a wireless network access point (215; 215A; 215B; 607); the method comprising:

a portable device (231; 521, 523) transmitting a probe request (233; 517, 519), wherein the portable device (231; 521, 523) is carried by a passenger (229; 511, 513) of the elevator system (201, 501, 601), and wherein the probe request (233; 517, 519) contains at least a first probe request data set (235), wherein the first probe request data set (235) is of a first type;

the wireless network access point (215; 215A; 215B; 607) detecting the probe request (233; 517, 519);

the at least one processor (211; 211A, 211B, 609) accessing data storage (213; 213A, 213B, 611) having stored therein a plurality of passenger profiles (217; 217A, 217B, 613) wherein each passenger profile (241) of the plurality of passenger profiles (217; 217A, 217B, 613) contains a first profile data set (243) of the first type and a second profile data set (247) representing at least one destination floor;

the at least one processor (211; 211A, 211B, 609) identifying a matching passenger profile (249; 525; 527; 615; 617) of the plurality of passenger profiles (217; 217A, 217B, 613), wherein the first profile data set (243) of the matching passenger profile (249; 525; 527; 615; 617) matches the first probe request data set (235);

the at least one processor (211; 211A, 211B, 609) determining an anticipated destination floor based on the second profile data set (247) of the matching passenger profile (249; 525; 527; 615; 617); and the at least one processor (211; 211A, 211B, 609) instructing the controller (207; 207A; 207B) to move the elevator car (203; 203A; 203B) to the anticipated destination floor.

2. The method of claim 1, wherein the first probe request data set (235) comprises a list of one or more Service Set Identifiers (237).

3. The method of claim 1, wherein the elevator system (501, 601) comprises one or more further wireless network access points (215A; 215B, 607).

4. The method of claim 1, wherein the wireless network access point (215; 215A; 215B) is located in or on the elevator car (203; 203A; 203B).

5. The method of claim 1, wherein the wireless network access point (215A; 215B) is located in or on the elevator car (203A, 203B) and the elevator system (601) comprises a further wireless network access point (607) in a respective elevator hall (605) on each floor served by the elevator system (601).

6. The method of claim 1, wherein the wireless network access point (607) is located in an elevator hall (605) on a floor served by the elevator system (601).

7. The method of claim 1, wherein the portable device (231; 521, 523) transmits a plurality of probe requests, wherein the probe request (233; 517, 519) is one of said plurality of probe requests.

8. The method of claim 1, further comprising detecting at least one further probe request transmitted by the portable device (231; 521, 523).

9. The method of claim 1, further comprising detecting, by a further wireless access point (215A, 215B, 607) or by one of the one or more further wireless access points (215A, 215B, 607), at least one further probe request transmitted by the portable device (231; 521, 523).

10. The method of claim 1, further comprising:

the at least one processor (211; 211A, 211B, 609) determining that a subsequent probe request has not been detected;

in response to the at least one processor (211; 211A, 211B, 609) determining that the subsequent probe request has not been detected, the at least one processor (211; 211A, 211B, 609) determining that the passenger (229; 511, 513) has exited the elevator car (203; 203A; 203B); and the at least one processor (211; 211A, 211B, 609) determining a floor on which the passenger (229; 511, 513) exited the elevator car (203; 203A; 203B).

11. The method of claim 1, further comprising:

receiving input from the passenger (229; 511, 513) to override the anticipated destination floor or to add a destination floor.

12. The method of claim 1, further comprising updating the matching passenger profile (249; 525; 527; 615; 617) based on the input received to override the anticipated destination floor or to add a destination floor and/or in response to determining the passenger (229; 511, 513) has exited the elevator car (203; 203A; 203B) at a different floor from the anticipated destination floor.

13. The method of claim 1, further comprising:

the wireless network access point (215; 215A; 215B; 607) detecting a new probe request from a further portable device carried by a further passenger, wherein the new probe request contains at least a first new probe request data set and wherein the first new probe request data set is of the first type;

the at least one processor (211; 211A, 211B, 609) determining that no matching passenger profile exists for which the first passenger profile data set matches the first new probe request data set; and the at least one processor (211; 211A, 211B, 609) creating a new passenger profile in the data storage, wherein the new passenger profile includes a first new passenger profile data set which comprises the first new probe request data set.

14. The method of claim 1, wherein the elevator system (501; 601) comprises more than one elevator car (203A; 203B).

15. An elevator system (201, 501, 601), comprising:

an elevator car (203; 203A; 203B);

a controller (207; 207A; 207B) for controlling the elevator car (203; 203A; 203B);

a wireless network access point (215; 215A; 215B; 607) configured to detect a probe request (233; 517, 519) transmitted by a portable device (231; 521, 523) carried by a passenger (229; 511, 513) of the elevator system (201, 501, 601), wherein the probe request (233; 517, 519) contains at least a first probe request data set (235), wherein the first probe request data set (235) is of a first type;

at least one processor (211; 211A, 211B, 609); and a computer-readable medium (213; 213A, 213B) having stored therein instructions which, when executed by the at least one processor (211; 211A, 211B, 609), cause the at least one processor (211; 211A, 211B, 609) to carry out the following method steps:

accessing data storage (213; 213A, 213B, 611), the data storage having stored therein a plurality of passenger profiles (217; 217A, 217B, 613) wherein each passenger profile (241) of the plurality of passenger profiles (217; 217A, 217B, 613) contains a first profile data set (243) of the first type and a second profile data set (247) representing at least one destination floor;

identifying a matching passenger profile (249; 525; 527; 615; 617) of the plurality of passenger profiles (217; 217A, 217B, 613), wherein the first profile data set (243) of the matching passenger profile (249; 525; 527; 615; 617) matches the first probe request data set (235);

determining an anticipated destination floor based on the second profile data set (247) of the matching passenger profile (249; 525; 527; 615; 617); and instructing the controller (207; 207A; 207B) to move the elevator car (203; 203A; 203B) to the anticipated destination floor.

* * * * *